(12) United States Patent
Hahn

(10) Patent No.: US 10,268,584 B2
(45) Date of Patent: Apr. 23, 2019

(54) ADAPTIVE HOST MEMORY BUFFER (HMB) CACHING USING UNASSISTED HINTING

(71) Applicant: SanDisk Technologies LLC, Plano, TX (US)

(72) Inventor: Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/050,364

(22) Filed: Feb. 22, 2016

(65) Prior Publication Data

US 2016/0246726 A1 Aug. 25, 2016

Related U.S. Application Data

(63) Continuation-in-part of application No. 14/464,584, filed on Aug. 20, 2014, now Pat. No. 10,007,442.

(51) Int. Cl.
*G06F 12/00* (2006.01)
*G06F 12/0862* (2016.01)
*G06F 12/1009* (2016.01)
*G06F 3/06* (2006.01)
(Continued)

(52) U.S. Cl.
CPC ........ *G06F 12/0862* (2013.01); *G06F 3/0613* (2013.01); *G06F 3/0659* (2013.01); *G06F 3/0679* (2013.01); *G06F 12/0246* (2013.01); *G06F 12/0868* (2013.01); *G06F 12/1009* (2013.01); *G06F 2206/1014* (2013.01); *G06F 2212/1021* (2013.01); *G06F 2212/1024* (2013.01); *G06F 2212/2022* (2013.01); *G06F 2212/281* (2013.01); *G06F 2212/311* (2013.01);
(Continued)

(58) Field of Classification Search
CPC ................................................... G06F 12/0246
USPC ........................................................ 711/103
See application file for complete search history.

(56) References Cited

U.S. PATENT DOCUMENTS

| 5,890,211 A * | 3/1999 | Sokolov ............... G06F 3/0676 711/113 |
| 6,092,154 A * | 7/2000 | Curtis .................... G06F 3/061 711/113 |
| 7,743,038 B1 | 6/2010 | Goldick |

(Continued)

OTHER PUBLICATIONS

Commonly-assigned, co-pending U.S. Appl. No. 14/977,559 for "Methods, Systems, and Computer Readable Media for Automatically and Selectively Enabling Burst Mode Operation in a Storage Device," (Unpublished, filed Dec. 21, 2015).

(Continued)

*Primary Examiner* — Tuan V Thai
*Assistant Examiner* — Tasnima Matin
(74) *Attorney, Agent, or Firm* — Loza & Loza, LLP; Gabriel Fitch

(57) ABSTRACT

A storage device includes a nonvolatile memory. The storage device further includes a hint derivation module for automatically deriving, from host accesses to the storage device, hints regarding expected future host accesses to a table that maps logical memory addresses to physical memory addresses in the nonvolatile memory. The storage device further includes an adaptive host memory buffer (HMB) caching module for using the hints to identify portions of the table to cache in the HMB and for caching the identified portions in the HMB, which is external to the storage device and accessible by the storage device via a bus.

20 Claims, 8 Drawing Sheets

(51) Int. Cl.
*G06F 12/02* (2006.01)
*G06F 12/0868* (2016.01)

(52) U.S. Cl.
CPC .............. *G06F 2212/466* (2013.01); *G06F 2212/6028* (2013.01); *G06F 2212/7201* (2013.01)

(56) References Cited

U.S. PATENT DOCUMENTS

| | | | |
|---|---|---|---|
| 7,937,393 B2 | 5/2011 | Prahlad et al. | |
| 8,275,946 B1* | 9/2012 | Smith ................ | G06F 12/0862 711/137 |
| 8,775,741 B1 | 7/2014 | de la Iglesia | |
| 2003/0188184 A1 | 10/2003 | Strongin et al. | |
| 2006/0106984 A1 | 5/2006 | Bartley et al. | |
| 2006/0179236 A1* | 8/2006 | Shafi ................. | G06F 12/0862 711/137 |
| 2008/0320211 A1 | 12/2008 | Kinoshita | |
| 2009/0031083 A1 | 1/2009 | Willis et al. | |
| 2009/0228875 A1 | 9/2009 | DeVries | |
| 2010/0262721 A1 | 10/2010 | Asnaashari et al. | |
| 2011/0296088 A1 | 12/2011 | Duzly et al. | |
| 2011/0320685 A1 | 12/2011 | Gorobets et al. | |
| 2012/0051137 A1 | 3/2012 | Hung et al. | |
| 2012/0144092 A1 | 6/2012 | Hsieh et al. | |
| 2012/0284587 A1 | 11/2012 | Yu et al. | |
| 2012/0317335 A1 | 12/2012 | Cho | |
| 2013/0024609 A1 | 1/2013 | Gorobets et al. | |
| 2013/0080732 A1 | 3/2013 | Nellans et al. | |
| 2013/0086311 A1 | 4/2013 | Huang et al. | |
| 2013/0138867 A1 | 5/2013 | Craft et al. | |
| 2013/0191349 A1 | 7/2013 | Akirav et al. | |
| 2013/0262533 A1 | 10/2013 | Mitra et al. | |
| 2013/0262736 A1* | 10/2013 | Kegel ................. | G06F 12/0888 711/3 |
| 2013/0275672 A1 | 10/2013 | Bert | |
| 2013/0297852 A1 | 11/2013 | Fal et al. | |
| 2014/0082324 A1 | 3/2014 | Elhamias et al. | |
| 2014/0149641 A1 | 5/2014 | Avila et al. | |
| 2014/0289492 A1* | 9/2014 | Ranjith Reddy ..... | G06F 3/0613 711/170 |
| 2014/0337560 A1* | 11/2014 | Chun ................. | G06F 12/0246 711/103 |
| 2015/0199269 A1 | 7/2015 | Bert et al. | |
| 2015/0356020 A1 | 12/2015 | Desai et al. | |
| 2016/0026406 A1 | 1/2016 | Hahn et al. | |
| 2016/0054931 A1 | 2/2016 | Romanovsky et al. | |
| 2016/0054934 A1 | 2/2016 | Hahn et al. | |

OTHER PUBLICATIONS

Non-Final Office Action for U.S. Appl. No. 14/297,563 (dated Dec. 4, 2015).
Non-Final Office Action for U.S. Appl. No. 14/464,584 (dated Dec. 4, 2015)
Commonly-assigned, co-pending U.S. Appl. No. 14/555,548 for "Storage Devices and Methods for Optimizing Use of Storage Devices Based on Storage Device Parsing of File System Metadata in Host Write Operations," (Unpublished, filed Nov. 26, 2014).
"Ext4 Disk Layout," https://ext4.wiki.kernel.org/index.php/Est4_Disk_Layout, Wikipedia, pp. 1-28 (Nov. 17, 2014).
"NVM Express," Specification Revision 1.2, http://nvmexpress.org/wp-content/uploads/NVM_Express_1_2_Gold_20141209.pdf, pp. 1-205 (Nov. 3, 2014).
"NVM Express Overview," NVM Express, pp. 1-2 (Copyright 2013).
"CreateFile function," Microsoft, Windows Dev Center, https://msdn.microsoft.com/en-us/library/windows/desktop/aa363858(v=vs.85).aspx, pp. 1-20 (2008).
"I/O Limits: block sizes, alignment and I/O hints," Red Hat, http://people.redhat.com/msnitzer/docs/io-limits.txt, pp. 1-4 (Jan. 14, 2013).
"Understanding the Flash Translation Layer (FTL) Specification," AP-684 Application Note, Intel, pp. 1-20 (Dec. 1998).
Notice of Allowance and Fees Due for U.S. Appl. No. 14/297,563 (dated Jul. 25, 2016).
Non-Final Office Action for U.S. Appl. No. 14/555,548 (dated Jul. 5, 2016).
"NVM Express," Specification Revision 1.2.1, http://www.nvmexpress.org/wp-content/uploads/NVM_Express_1_2_1_Gold_20160603.pdf, pp. 1-217 (Jun. 5, 2016).
Prabhakaran et al., "Analysis and Evolution of Journaling File Systems," 2005 USENIX Annual Technical Conference, pp. 105-120 (2005).
Final Office Action for U.S. Appl. No. 14/464,584 (dated Apr. 26, 2016).
Final Office Action for U.S. Appl. No. 14/297,563 (dated Apr. 13, 2016).
Non-Final Office Action for U.S. Appl. No. 14/814,460 (dated Mar. 28, 2016).
Hahn, et al., Office Action dated Aug. 25, 2017 for U.S. Appl. No. 14/464,584.
Romanovsky, et al., Office Action dated Aug. 9, 2017 for U.S. Appl. No. 14/555,548.
Hahn, et al., Non-Final Office Action dated Nov. 18, 2016 for U.S. Appl. No. 14/464,584.
Romanovsky, et al., Final Office Action dated Jan. 25, 2017 for U.S. Appl. No. 14/555,548.

* cited by examiner

ADAPTIVE HOST MEMORY BUFFER (HMB) CACHING USING UNASSISTED HINTING

PRIORITY CLAIM

This application is a continuation-in-part of U.S. patent application Ser. No. 14/464,584 filed Aug. 20, 2014, the disclosure of which is incorporated herein by reference in its entirety.

TECHNICAL FIELD

The subject matter described herein relates to reducing latency in read operations to flash translation layer (FTL) tables. More particularly, the subject matter described herein relates to adaptive HMB caching of FTL tables using unassisted hinting.

BACKGROUND

Nonvolatile storage devices, such as NAND-based storage devices, include a translation layer that maps logical block addresses (LBAs) used by the host to access memory on the device into physical addresses in the nonvolatile memory. This translation layer is implemented in NAND-based storage devices as FTL tables. Because FTL tables must be accessed any time a host system desires to read a file from a storage device, latency in accessing FTL table entries can affect host device performance. In some high performance solid state drives (SSDs), the FTL table is stored in DRAM on the SSD to reduce latency. In such devices, the ratio of DRAM consumed for FTL tables to the total capacity of the device is 1 to 1,000, e.g., one megabyte of FTL table data is required to effectively address one gigabyte of NAND storage. The performance difference between accessing NAND storage and accessing device DRAM is considerable. For example, access to NAND for a read operation is typically a minimum of 50 to 70 microseconds per read while accessing device DRAM is on the order of hundreds of nanoseconds.

Because of the latency incurred by using device DRAM to cache FTL tables, one protocol, referred to as the nonvolatile memory express (NVMe) protocol includes a feature called the host memory buffer (HMB) which allows usage of host DRAM as a cache for FTL tables. HMB latency is on the order of ones of microseconds.

In some operating systems, such as in Windows environments, there is an architectural limit on the amount of host memory that can be allocated to direct access by peripheral component interface express (PCIe) devices. This memory must be dedicated from the non-paged pool and locked to specific physical addresses which the host cannot reallocate, limiting host memory efficiency. As a result, host environments are reluctant to allocate the full 1 to 1,000 ratio that would allow full mapping tables to be stored in the HMB.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

The subject matter described herein includes methods, systems, and computer readable media for adaptive HMB caching of FTL data using hints derived from accesses to a storage device and from file system metadata and for caching the FTL data in a manner that reduces latency in future FTL access based on the hints. The operations described herein are performed at the storage device level, for example, using a hardware or firmware adaptive HMB caching module and a hint derivation module that automatically detects patterns in data that is written to a storage device and derives hints from the patterns regarding how data will likely be accessed by a host. The hint derivation module may also utilize frequency of accesses to memory locations and file system metadata to derive hints. The adaptive HMB caching module utilizes the hints to determine how to cache FTL data in the HMB and on the storage device to reduce latency in future accesses.

Figure 1:
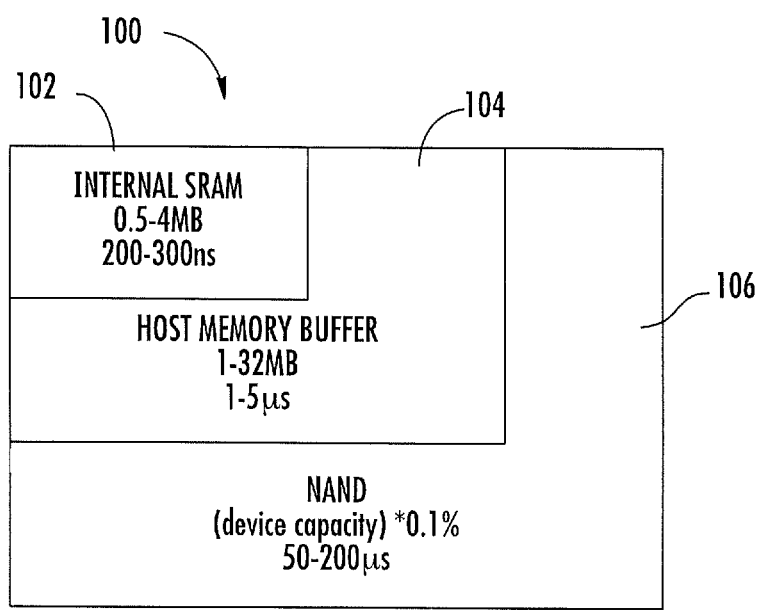
FIG. 1 is a block diagram illustrating tiered storage of an HMB according to an embodiment of the subject matter described herein.

In one embodiment, an adaptive HMB caching module according to the subject matter described herein may maintain a tiered structure where portions of FTL data are stored in the HMB cache and other portions are stored in primary storage on the storage device and in nonvolatile storage on the storage device. FIG. 1 illustrates an exemplary tiered structure for an FTL cache that may be maintained by an adaptive HMB caching module according to an embodiment of the subject matter described herein. Referring to FIG. 1, a tiered FTL cache 100 includes a primary level cache 102 that is maintained in SRAM on a memory controller of the storage device. The primary FTL cache 102 has an access time of 200 to 300 nanoseconds for reads but the amount of storage space is limited. As a result, the adaptive HMB caching module preferable only places FTL data in primary FTL cache 102 that is currently being accessed or likely to be accessed in the next few operations by the host. For example, primary FTL cache 102 may store data for accessing the next few frames of a video file if the user is viewing a movie.

FTL cache 100 further includes a secondary FTL cache 104 that is maintained in the host memory buffer. Secondary FTL cache 104 may be stored in host DRAM and accessible by storage device 200 across a host memory bus. The access time for entries in secondary FTL cache 104 is on the order of microseconds. Secondary FTL cache 104 is larger than primary FTL cache 102. Accordingly, secondary FTL cache 104 may store FTL data that is likely to be accessed next but not necessarily the data that is currently being accessed. Continuing with the movie example, FTL data for the remainder of the movie after the next few frames may be stored in secondary FTL cache 104.

Tiered FTL cache 100 further includes tier 3 FTL storage 106 that is maintained in NAND or nonvolatile storage of the storage device. The access time for reading data from current NAND memory devices is on the order of 50 to 200 microseconds. Accordingly, it is desirable to minimize the amount of FTL data stored in tier 3 FTL storage 106 or to only store FTL data that is not likely to be accessed in the near future by the host device.

Figure 2:
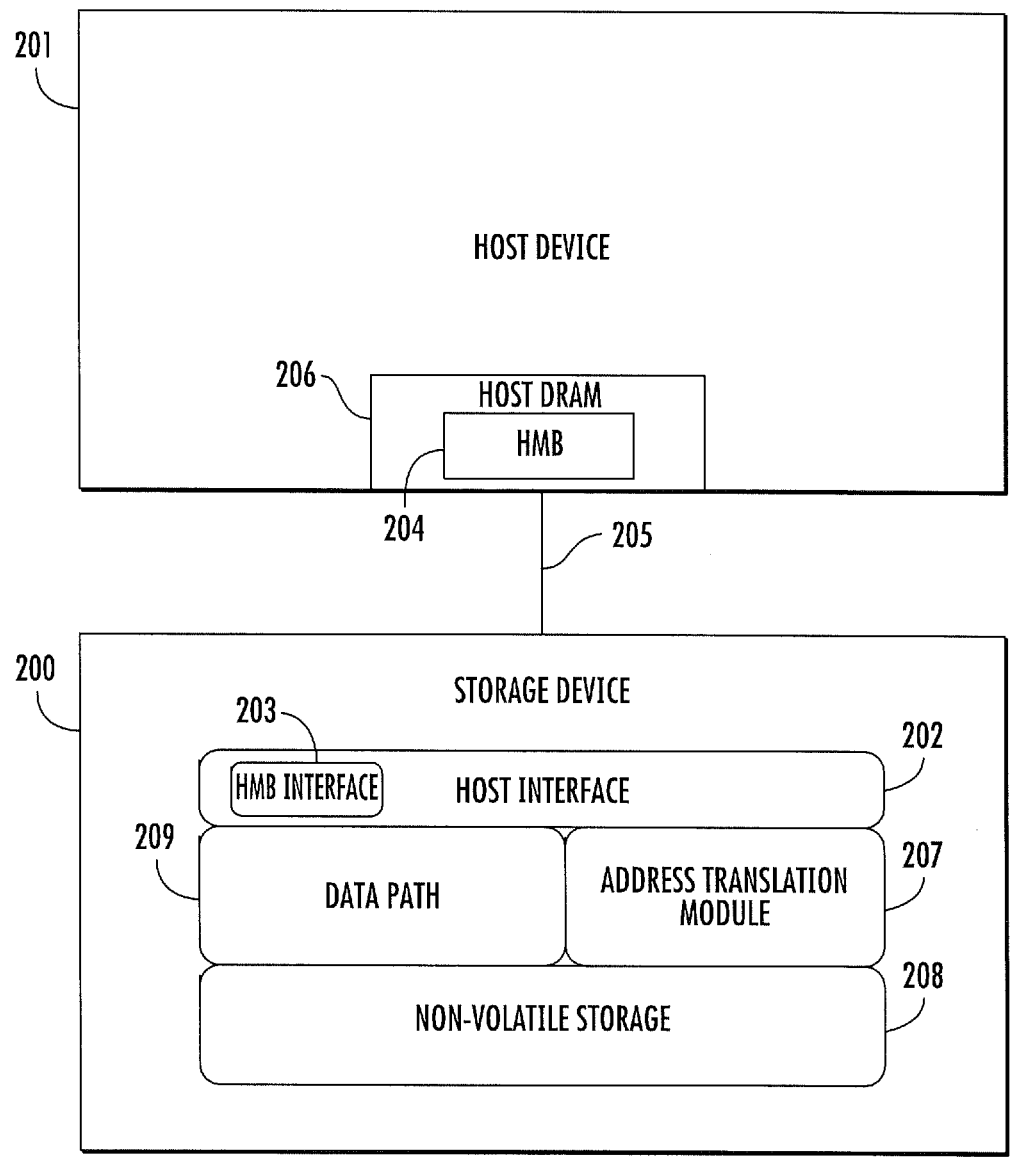
FIG. 2 is a block diagram illustrating an exemplary operating environment for the subject matter described herein.

The tiered structure illustrated in FIG. 1 may be utilized in a nonvolatile storage device environment, such as that illustrated in FIG. 2.

FIG. 2 is a block diagram of an exemplary operating environment in which adaptive HMB caching using unassisted hinting described herein may be used. Referring to FIG. 1, a storage device 200 provides nonvolatile storage for a host device. Storage device 200 may be any suitable device that incorporates nonvolatile memory and that allows access to that memory by a host device. In one example, storage device 200 may be a NAND flash device. However, other storage devices may also be used within the scope of the subject matter described herein. For example, storage device 200 may be a NOR flash device, a solid state drive that incorporates NOR and/or NAND flash memory, or a device that combines solid state storage with disk storage.

Storage device 200 may include hardware, software, and firmware components. For example, storage device 200 typically includes a storage controller that controls access by host device 201 to nonvolatile memory storage. As described above, storage device 200 may also include hardware or firmware components that implement adaptive HMB caching utilizing unassisted hinting as described herein. These components will be described in more detail below.

Host device 201 may include any suitable device that can communicate with storage device 200 over bus 205. In one example, host device 201 may be a computing platform that has access to one or more storage device 200. The type of computing platform may depend on the type and scale of application. For example, host device 201 may be a personal computer that has access to a single storage device 200 or a storage controller with access to multiple storage devices 200.

In the illustrated example, storage device 200 includes a host interface 202 for interfacing with host device 201. Host interface 202 may be any suitable interface for handling I/O operations between host device 201 and nonvolatile memory. For example, host interface 202 may be a peripheral component interface express (PCIe) interface or any other suitable interface for receiving I/O commands from a host system, that also includes the ability for the device to asynchronously and directly access host memory. In the illustrated example, host interface 202 includes an HMB interface 203 for interfacing with HMB 204 across host memory bus 205. HMB 204 is stored in host DRAM 206. As will be described in detail below, HMB 204 may be used to cache a portion of FTL tables based on hints derived from accesses to storage device 200.

An address translation module 207 translates from the address space by the host to the address space used by storage device 200 to access nonvolatile storage 208. In one example, host device 201 may use logical addressing by specifying logical block addresses (LBAs) in I/O operations to storage device 200, storage device 200 may use physical addressing to specify memory locations, and address translation module 207 may translate between the logical address space and the physical address space using FTL data stored in HMB 204, storage device SRAM and/or nonvolatile storage 208.

Nonvolatile storage 208 may comprise the physical memory cells where data is stored. For example, in the case of flash memory, nonvolatile storage 208 may include NAND or NOR flash memory cells in two-dimensional, three-dimensional, or combinations of two-dimensional and three-dimensional configurations. As stated above, nonvolatile storage 208 may also include one or more disk storage devices. Storage device 200 further includes a data path 209 that communicates data from host device 201 to nonvolatile storage 208 and from nonvolatile storage 208 to the host. Data path 209 may include data buffers and error detection and correction modules for ensuring data integrity. In addition, as will be described in detail below, data path 209 may also include hint derivation and memory utilization optimization.

Figure 3:
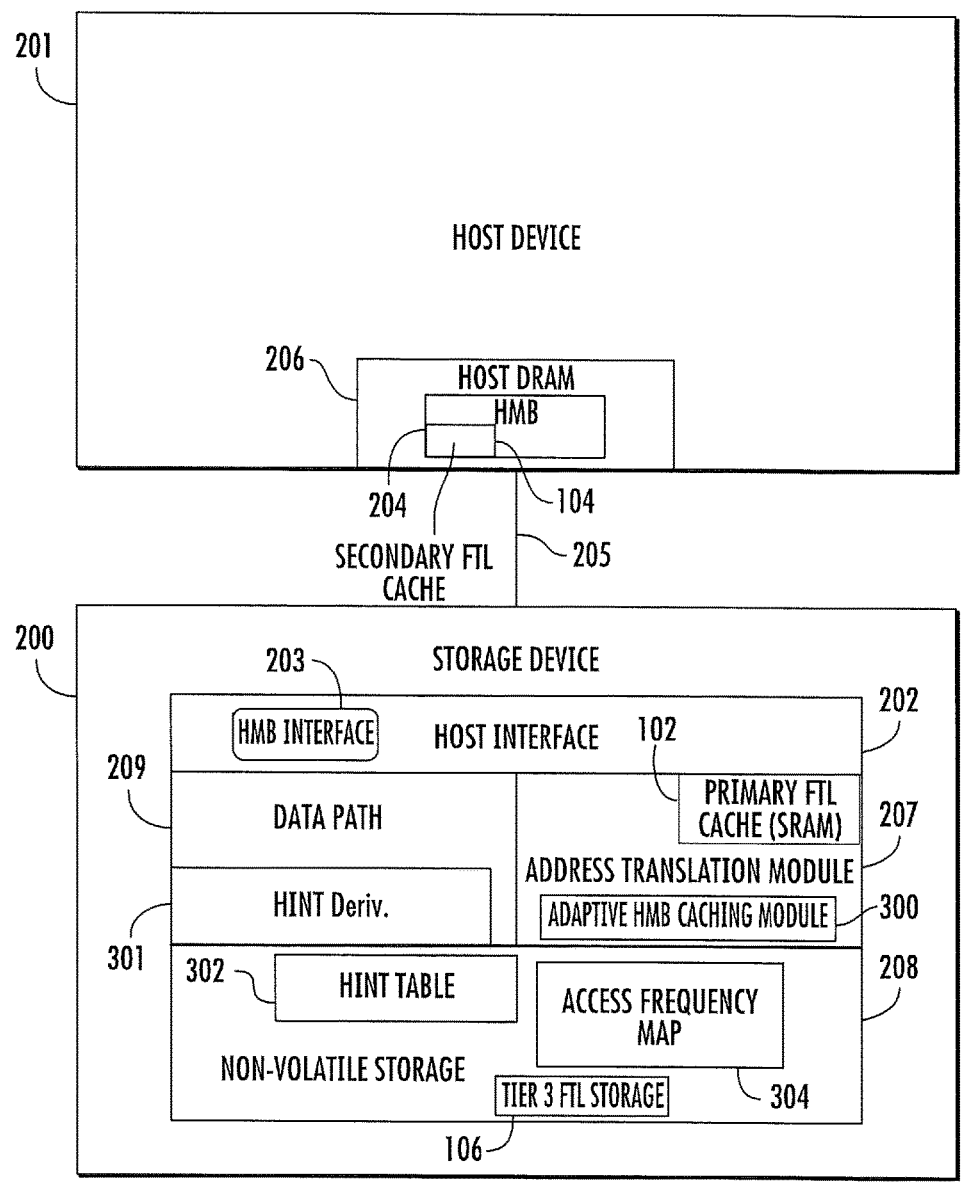
FIG. 3 is a block diagram of exemplary components of a storage device with a hint derivation and memory utilization optimization module, hint tables, and a access frequency map according to an embodiment of the subject matter described herein.

FIG. 3 is a block diagram of storage device 200 and host device 201 in FIG. 2 where storage device 200 includes an adaptive HMB caching module 300 and a hint derivation module 301. Adaptive HMB caching module 300 may optimize storage of FTL data to reduce latency in subsequent reads using hints derived by hint derivation module 301 from I/O accesses and/or file system metadata. In the illustrated example, FTL data may be stored in primary FTL cache 102, which is maintained in SRAM on the memory controller of storage device 200, in secondary FTL cache 104, which is maintained in HMB 204 and in tier 3 FTL storage 106, which is maintained in nonvolatile storage 208. In FIG. 2, adaptive HMB caching module 300 and hint derivation module 301 may comprise hardware or firmware components of storage device 200 that reside on the storage device side of host interface 202. Hint derivation module 301 analyzes incoming data for patterns. Hint derivation module 301 may also detect the access frequency for LBAs in I/O requests from host device 201. Hint derivation module 301 may also derive hints from file system metadata. Adaptive HMB caching module 300 may use the hints to optimize utilization nonvolatile storage of FTL data. Examples of optimizations that may be performed will be described below.

A hint table 302 stores LBA ranges and corresponding hints that indicate how the corresponding LBA range will likely be accessed by the host system in the future. In one example, the hints may be file types, which provide an indication of how the files and their associated FTL table entries will subsequently be accessed by the host system. Access frequency map 304 stores LBA ranges and frequencies of access for the ranges. Access frequency map 304 may be in the form of statistics, counters, logs, or any other direct or derived mechanism for recording access frequencies for different LBAs. Hint table 302 and the access frequency map 304 may be stored in any suitable location within storage device 200. For example, hint table 302 and access frequency map 304 may be stored in nonvolatile storage 208 or in cache memory that is separate from nonvolatile storage 208. In addition, hint table 302 and access frequency map 304 may be combined into a single data structure so that an access frequency is specified for each LBA range entry in hint table 302.

Figure 4:
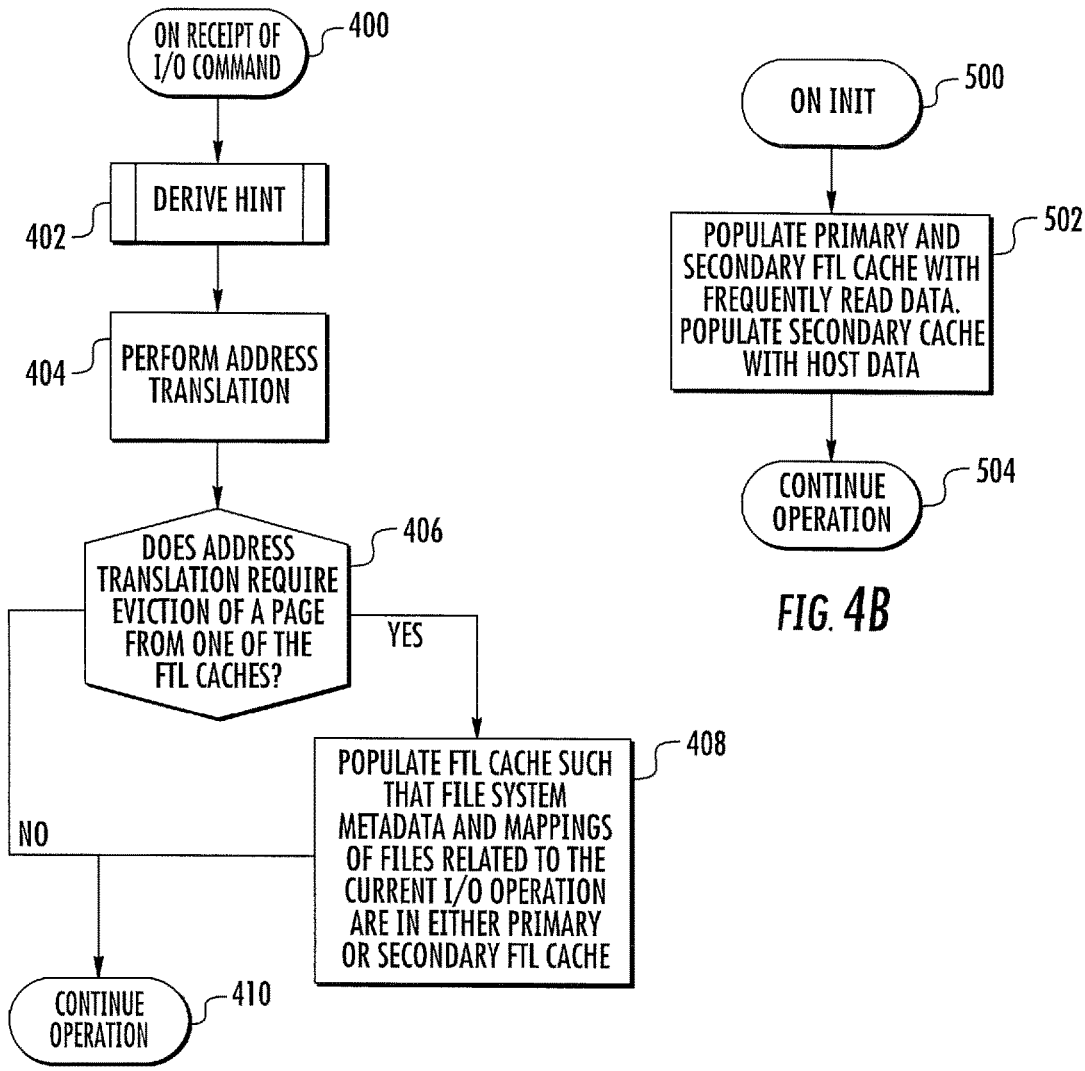
FIGS. 4A and 4B are flow charts illustrating exemplary processes for adaptive HMB caching using unassisted hinting according to an embodiment of the subject matter described herein.

FIGS. 4A and 4B are flow charts illustrating an exemplary process for adaptively caching FTL data using unassisted hinting according to an embodiment of the subject matter described herein. More particularly, FIG. 4A is a flow chart illustrating adaptive HMB caching using unassisted hinting that is performed when a new memory access command is received and FIG. 4B illustrates exemplary operations for initializing FTL cache at start up. Referring to FIG. 4A, in step 400, an I/O command is received. In this example, it is assumed that the I/O command is a memory read command received by storage device 200 over bus 205. In step 402, a hint is derived from the memory read command. The hint may be derived by hint derivation module 301 using data stored in hint table 302 and/or access frequency map 304. Detailed examples of hint derivation will be described below. In step 404, an address translation is performed for the I/O command. For example, address translation module 207 may translate the logical addresses in the memory access to physical addresses using FTL data. In step 406, it is determined whether the address translation requires eviction of a page from one of the FTL caches to allow caching of the FTL data needed for the current I/O command. Determining whether eviction of a page is necessary includes determining whether the hint derived from the command requires the addition of FTL data to one or more of the caches illustrated in FIG. 3. For example, if the FTL data required for memory accesses related to a particular read are already in the primary or secondary FTL cache, then it is not necessary to evict data from one of the caches. However, if the FTL data expected to be needed in the near future is not in either the primary or secondary FTL cache, eviction of a page from one of the FTL caches may be required. Accordingly, control proceeds to step 408 where the FTL cache is populated such that file system metadata and mappings of files relating to the current I/O operation are in either the primary or secondary FTL cache.

After caching the FTL data or determining that such caching is not required, control proceeds to step 410 where operation is continued. Continuing operation may include performing the I/O operation requested by the I/O command and/or subsequent commands.

In FIG. 4B, exemplary steps that occur at startup to initialize FTL caches 102 and 104 are illustrated. Referring to FIG. 4B, in step 500, on startup of the host system, storage device 200 is initialized. In step 502, the primary and secondary FTL caches are populated with frequently read data, such as data that is frequently read on boot up. If the host file system is the new technology file system (NTFS), the secondary FTL cache is populated with master file table (MFT) data. The master file table stores all the data used by the file system to identify and access files. Such data is needed whenever a host application desires to open a file. If a host file system other than NTFS is utilized, a file table that serves an equivalent purpose to the MFT may be cached in the secondary FTL cache.

In step 504, operation of the storage device continues. Continuing operation of the storage device may include gradually replacing the data in the primary and secondary FTL caches with FTL data expected to be accessed next using the hints derived from subsequent memory accesses. It should be noted that when performing address translation, one or more pages may be required for each operation. In addition, multiple instances of adaptive HMB caching module 300 may execute. As a result, multiple simultaneous flows for populating FTL caches 102 and 104 may occur simultaneously.

As illustrated by step 402 in FIG. 4A, hint derivation is performed prior to FTL caching. A hint may be derived in line from an access to storage device 201.

Figure 5:
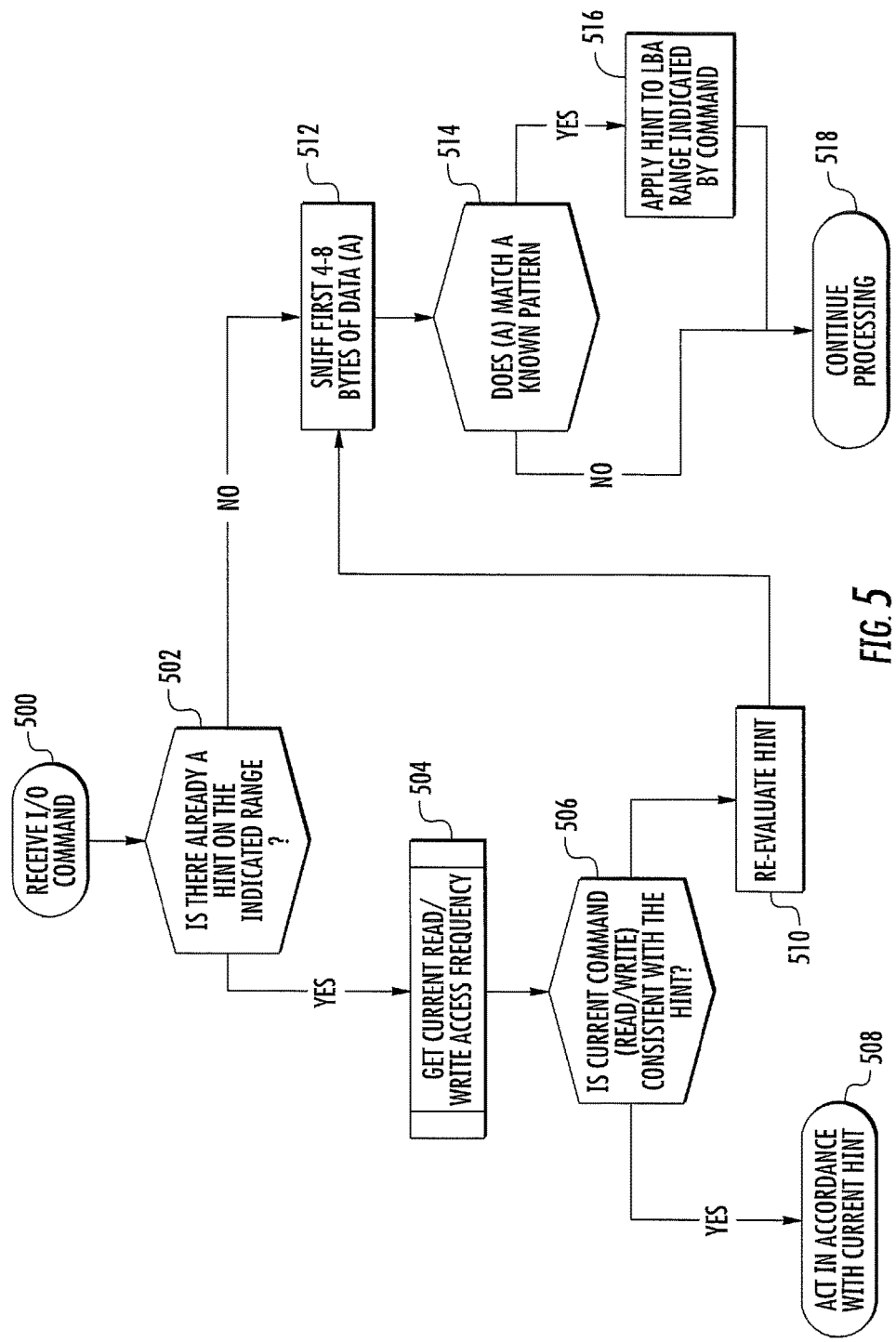
FIG. 5 is a flow chart illustrating an exemplary process for in-line hint derivation and memory utilization optimization according to an embodiment of the subject matter described herein.

FIG. 5 is a flow chart illustrating exemplary steps for in-line hint derivation according to an embodiment of the subject matter described herein. By "in-line", it is meant that hints associated with the anticipated host memory access pattern are derived by the storage device while performing a host initiated I/O operation. In-line hint derivation is believed to be beneficial because it can be used to immediately adjust FTL caching. However, the subject matter described herein is not limited to in-line hint derivation and memory utilization optimization. Hint derivation may be performed asynchronously with respect to I/O operations. Asynchronous hint derivation may not allow optimization of how data is initially stored. However, the data can be subsequently moved to optimize utilization of storage device 200.

Referring to FIG. 5, in step 500, an I/O command is received. The I/O command may be a read command or a write command received by hint derivation module 301. In step 502, it is determined whether or not a hint already exists for the LBA range in the I/O command. In order to determine whether a hint exists for the range specified in the I/O command, hint derivation module 301 may extract the LBA range from the I/O command sequence and perform a lookup in hint table 302 to determine whether an entry for the LBA range is present in hint table 302. Table 1 shown below illustrates exemplary entries that may be present in hint table 302:

TABLE 1

Exemplary Hint Table Entries

| LBA Range | Hint |
|---|---|
| 0x00000000-0x3FFFFFFF | 4K Movie File |
| 0x40000000-0x400001F3 | Executable File |
| 0x50000000-0x8FFFFFFF | Swap File |

In Table 1, the left hand column includes LBA ranges corresponding to previous I/O operations by host device 201 for which hints have been derived. The right hand column includes corresponding hints. In the illustrated example, the hints are file types which provide insight as to how the data may be accessed by the host in the future. For example, the first entry in the hint table indicates that the LBA range stores a 4K movie file. Due to the file size, a 4K movie file is likely to require multiple accesses to FTL data. 4K refers to 4K resolution, which means that there are approximately 4000 pixels in each horizontal scan line. If the I/O command received is a read for the 4K movie file, it may be desirable to move FTL table entries stored in nonvolatile storage 208 to HMB 204. It may also be desirable to move at least some of the FTL table entries for the 4K movie file to FTL cache 102. Similar operations may be performed if the I/O command is a read request for other file types that are likely to require multiple accesses to FTL data.

The second entry in Table 1 is an executable file. An executable file is likely to be written once and then read sequentially when the corresponding program is executed. An executable file may therefore be stored or distributed across memory cells in a manner that is optimal for sequential read access. The executable file may be stored in static or dynamic regions of nonvolatile storage 208 depending on the type of program and anticipated frequency of access. For example, if the program is a web browser which is likely to be frequently accessed, the web browser may be stored in a dynamic portion of nonvolatile storage 208. If however, the program is a back-up program that runs only once per week, the program may be stored in a static region of nonvolatile storage 208.

The third entry in Table 1 includes a hint that indicates that the file is a system swap file. A swap file is typically frequently accessed because it enables an operating system to use secondary storage devices, such as storage device 200, to simulate extra memory. When the system runs low on memory, it swaps a section of system Random Access Memory (RAM) that an idle program is using onto the storage device to free up memory for other programs. A swap file is preferably stored in a dynamic region of nonvolatile storage 208 in light of the frequent access and low latency requirement of a swap file. A dynamic region of nonvolatile storage 208 may, in addition to having a large number of remaining program and erase cycles, be a region with relatively low access latency, as compared with other regions of nonvolatile storage 208.

Returning to step 502 in FIG. 5, if a hint is present, control proceeds to step 504 where the current read or write access frequency is determined. This step may be performed by hint derivation module 301 accessing access frequency data stored for the LBA range in the I/O operation in access frequency map 304. In step 508, it is determined whether the current command is consistent with the hint. Determining whether the current command is consistent with the hint may include examining the command type and/or the access frequency data to determine whether the hint needs to be reevaluated. For example, if the hint stored for a particular LBA range indicates that the file stored is JPEG image file and the command is a write command, the hint may require reevaluation, as it is unlikely that a JPEG file will be overwritten by the host once it is written the first time. In the same example, if the command for the LBA range is a read command for a previously stored JPEG file, then the command is consistent with the current hint. If the current command is consistent with the hint, control proceeds to step 508, where an action is performed in accordance with the current hint. Performing an action in accordance with the current hint may include carrying out the I/O operation, caching FTL data in the appropriate cache, and updating the associated access frequency data. Continuing with the JPEG file example, the read command may be executed and FTL entries associated with any unread portions of the file that are expected to be read next may be cached in either the primary or secondary HMB caches. If the current command is not consistent with the hint, control proceeds to step 510 where hint re-evaluation begins.

As part of hint re-evaluation, in step 512, the first four bytes of data in the command are analyzed. In step 514, it is determined whether the data matches a known pattern. Table 2 shown below illustrates different patterns that may be analyzed in a Macintosh (MAC)- or Windows-based file system.

TABLE 2

Windows and Mac OS File System Patterns

| Pattern | Hint |
| --- | --- |
| "FILE" | NTFS MFT entry |
| "PK" | ZIP compressed file (including JAR files, Android APK files, and compressed document files) |

TABLE 2-continued

Windows and Mac OS File System Patterns

| Pattern | Hint |
| --- | --- |
| "RCRD", "RSTR" | NTFS log metadata |
| 0xFE 0xED 0xFA | Mach-O executable |
| "HIBR" | Hibernate data |
| "MZ" | Windows or UEFI executable |
| 00 00 00 18 66 74 79 70 00 00 00 1C 66 74 79 70 | MPEG-4 video file |
| "ID3" | ID3v2-tagged MP3 file |
| "MDMP" | Windows minidump file |
| "PAGEDUMP" | Windows pagedump file |
| 0x89, "PNG" | PNG Image file format |
| 0x42 0x4D | BMP Image file format |
| "GIF" | GIF Image file format |

In the examples in Table 2, the patterns in the left-hand column correspond to file type in the right-hand column. The file types can be used by storage device 200 to determine how that file will be accessed. For example, if the file is an executable file, it is known that executable files are relatively static. That is, they are typically written once to nonvolatile storage, not modified, but may be completely erased and replaced. Thus, an executable file may be written to a static or portion of nonvolatile storage. In another example, if the data contains the pattern "PK", or is determined to be an image file format, or is determined to be of particular audiovisual file formats, then the file may be determined to be a compressed file. A compressed file is not likely to require recompression and thus may be stored in static portion of nonvolatile storage 208.

Continuing with step 514, it is determined whether the first 4 to 8 bytes of data in the data or payload portion of the I/O command sequence matches a known pattern. If the data matches a known pattern, control proceeds to step 516 where a hint is applied to the logical block address range indicated by the I/O command. Applying the hint may include storing the derived hint for the LBA range in the hint table and treating the data in accordance with the identified file type to optimize utilization of the memory storage device. If the hint does not match a known pattern, control proceeds to step 518 where processing is continued. Continuing the processing may include completing the I/O command and updating the access frequency for the LBA range.

Figure 6:
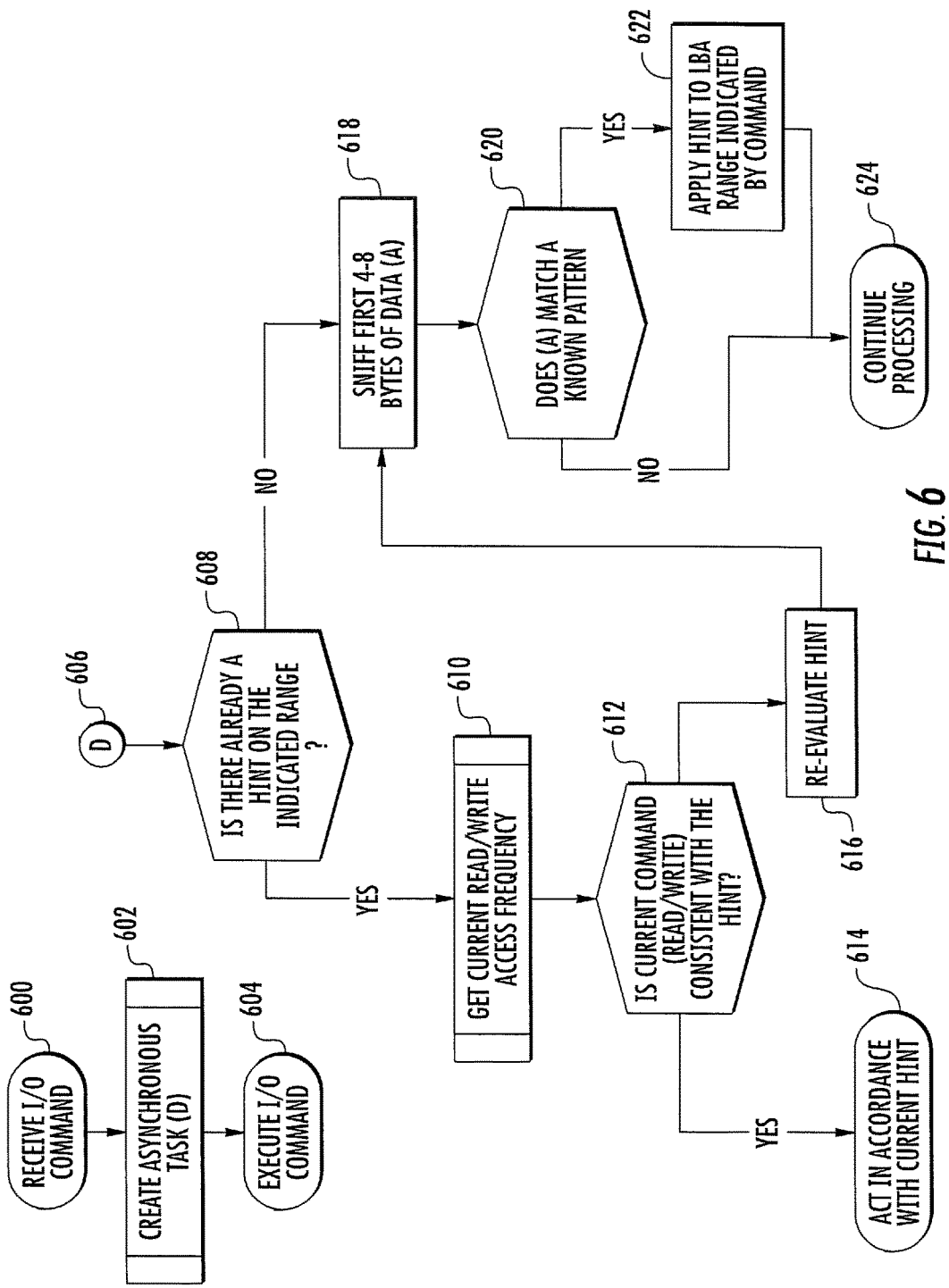
FIG. 6 is a flow chart illustrating an exemplary process for asynchronous hint derivation and memory utilization optimization according to an embodiment of the subject matter described herein.

As stated above, the subject matter described herein is not limited to deriving hints in-line, although such derivation is desirable because it allows any storage device optimizations to be performed when data is initially stored in nonvolatile storage 208. The subject matter described herein also includes deriving hints asynchronously, i.e., performing the I/O operations and deriving hints asynchronously from the I/O operations. Deriving hints asynchronously is likewise beneficial to ensure repeated optimization of storage resources. FIG. 6 is a flow chart illustrating asynchronous hint derivation according to an embodiment of the subject matter described herein. Referring to FIG. 6, in step 600, an I/O command is received. The I/O command may be a read command or a write command regarding a specific LBA range. In step 602, an asynchronous task "D" is created to derive the hint for the I/O command. Creating the asynchronous task may include spawning a thread or process that analyzes the data in the I/O command sequence and any previously stored hints. In step 604, the I/O command is executed independently of the process that derives and acts on the hint. Referring to step 606, asynchronous task D begins its execution. The asynchronous task D executes steps 608-624 to derive the hint and apply the hint. Steps 608-624 are the same as steps 504-518 described above with respect to FIG. 5, with the exception that applying the hint (step 614 or 626) occurs independently of the current I/O operation. For example, applying hints may include marking the LBA ranges in the hint table such that when NAND maintenance operations, read look ahead, or other logical operations optimizing the data are utilized, the hint is available and is used as a method of making decisions about the data. For example, if the hint indicates that the data is temporary, it may be skipped in relocation decisions. Alternatively, if the data is expected to be heavily read but not written often, it may be grouped together with other "hot read" data to reduce read scrub copies of data which is relatively static. Applying the hint may also include caching FTL table entries in either the primary or secondary FTL caches for data that is expected to be read in the near future.

As stated above, hint derivation may also occur by parsing file system metadata. File system metadata refers to data that is written by the file system to nonvolatile storage to characterize files. File system metadata may be parsed for hint derivation as it is written to storage device 200, during storage device idle time, or opportunistically during maintenance operations that access the physical blocks in which the metadata is stored. File system metadata typically includes the following information about each file (all attributes are present in NTFS, HFS+, and the ext4 file system):

Access times (last access, last modification, creation time)
Filename
Directory structure
Extent map (map of file offsets to LBA ranges)

In some file systems (such as NTFS and HFS+), the extent map may include resident portions in a central file (called the catalog file in HFS+ and the MFT in NTFS), as well as a non-resident extension used for additional extent maps in severely fragmented files. Depending on internal device resources, storage device 200 may elect not to de-reference non-resident extents into hints.

Filename parsing works based on common usage patterns associated with file extensions or directory trees. For example, the Windows operating system uses the "Program Files" and "Program Files (×86)" directories to store executable resources, which are typically static. Furthermore, executables in Windows tend to have an extension of "EXE" or "DLL". Correspondingly, Mac OS X uses directories with the extension ".app" to store executables. (The actual executables in Mac OS X do not have an identifying extension.) Temporary files have a ".tmp" extension or are in a directory called "tmp" or "Temporary Internet Files". Internet browser cache files (which are also short-lived) may have identifying characteristics such as brackets in the filename, enclosing a single digit.

Figure 7:
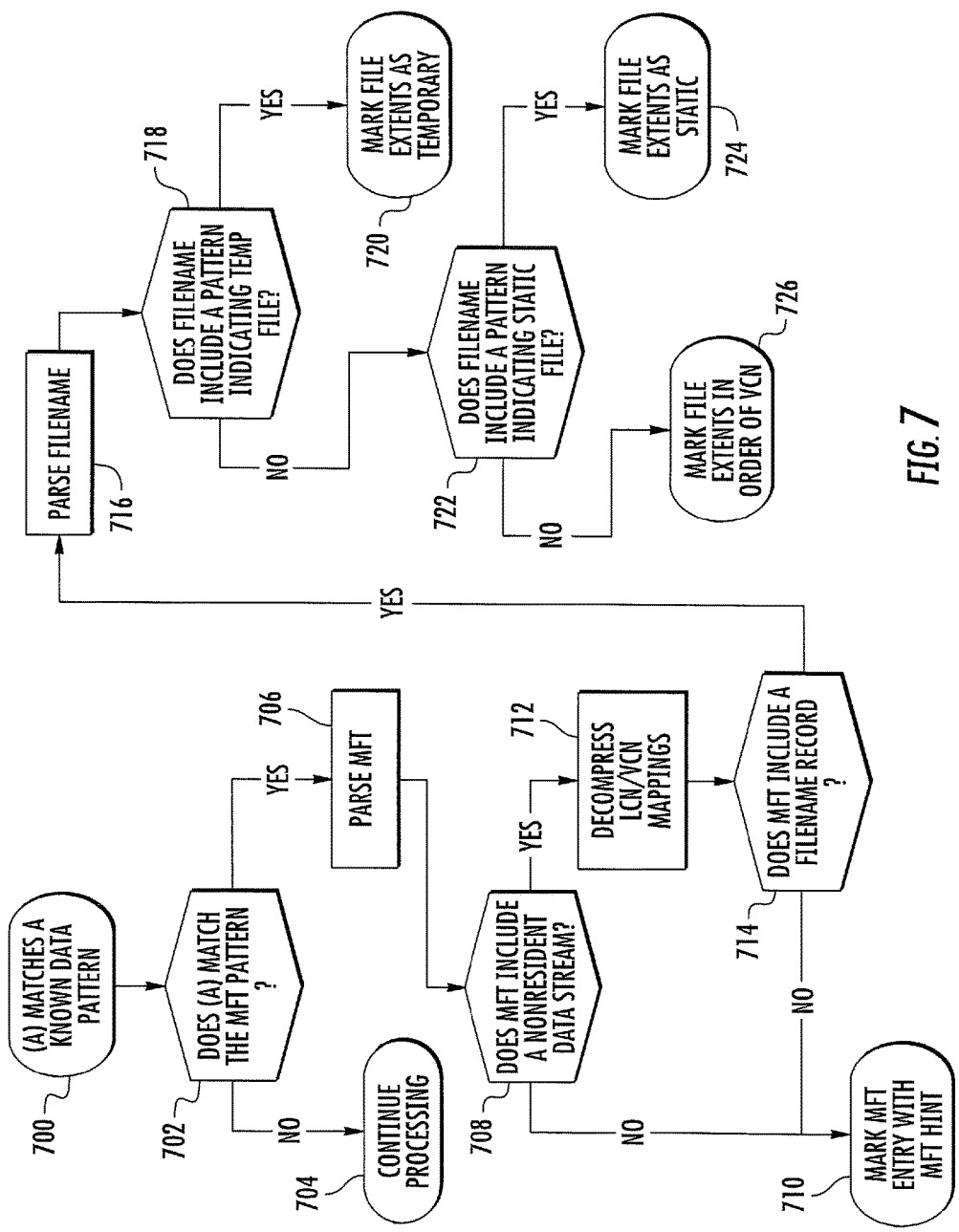
FIG. 7 is a flow chart illustrating an exemplary process for parsing file names in a master file table according to an embodiment of the subject matter described herein.

FIG. 7 illustrates hint derivation by file name parsing according to an embodiment of the subject matter described herein. In step 700, it is determined whether data in an I/O command sequence received by storage device 200 matches a known data pattern. In step 702, it is determined whether the data matches the MFT pattern. As illustrated by the first entry in Table 2, the MFT pattern is the characters "FILE". Thus, if the data parsed from the I/O operation includes the characters "FILE", then the I/O operation may be determined to be a write to the MFT table. If the operation does not match the MFT pattern, control proceeds to step 704 where processing is continued. Continuing the processing may include performing another type of hint derivation, such as based on last written and last read attributes maintained by the file system as will be described in more detail below.

In step 702, if the data matches the MFT pattern, control proceeds to step 706, where the MFT is parsed. Parsing the MFT includes locating the MFT entry corresponding to the I/O operation. Parsing the MFT continues in step 708, where it is determined whether the MFT entry stores a non-resident data stream. A non-resident data stream is a file whose location is specified in the MFT entry, but which is stored external to the MFT. A resident data stream is a file that is stored in the MFT entry. Accordingly, a write to the MFT for a resident file is a write to the file. Thus, if the MFT entry has a resident file, control proceeds to step 710 where the MFT entry is marked with a hint indicating that the entry includes an MFT resident file.

Returning to step 708, if the MFT entry includes a non-resident data stream, i.e., a pointer to one or more locations outside of the MFT that stores the corresponding file, control proceeds to step 712 where the logical cluster number/virtual cluster number (LCN/VCN) mappings that indicate storage locations for a non-resident file are decompressed. In step 714, it is determined whether the MFT entry includes a file name record. If the MFT entry does not include a file name record, control returns to step 710 where the entry is marked with an MFT hint. An MFT hint may explicitly identify the entry as an MFT entry.

If the MFT entry includes a file name record, control proceeds to step 716 where the file name is parsed. File name parsing continues in step 718 where it is determined whether the file name includes a pattern indicating a temp file. File names for temp files vary per operating system. In a Windows-based operating system, a temp file may end with the suffix ".tmp" or may include closed brackets that surround a single number. If the file name pattern indicates a temp file, control proceeds to step 720 where the file extents that store the file are marked as temporary. Marking the extents as temporary may include inserting hints in the MFT table that marks the extents as temporary or adding entries to the hint table that mark the LBA ranges corresponding to the file extents or containing a temp file.

Returning to step 718, if the file name does not include a pattern identifying the file as temporary, control proceeds to step 722 where it is determined whether the file name includes a pattern identifying a static file. As described above, examples of static files are executable files and sometimes image files. If the file name includes a pattern identifying the file as static, control proceeds to step 724 where the extents are marked as static. If the file name does not include a pattern indicating a static file, control proceeds to step 726 where the extents are marked in the order specified by the virtual cluster numbers in the MFT table. The purpose of ordering the extents allows the storage device to know the order of data in the file so that the device can reorder the file for optimal host access. Reordering the file may include storing the extents of the file in different memory blocks so that they can be read out in parallel.

As stated above, another approach to parsing file system metadata is to parse last written and last read attributes in the file system and to combine these attributes with correctable error count rates or with internal counters in order to determine the access frequency of the read and optimize read scrub algorithms. Correctable error rates would correlate with increased read activity in some storage types and may be augmented by device based historical data collected on reads and writes to extents that map to files that are expected to be heavily accessed.

Figure 8:
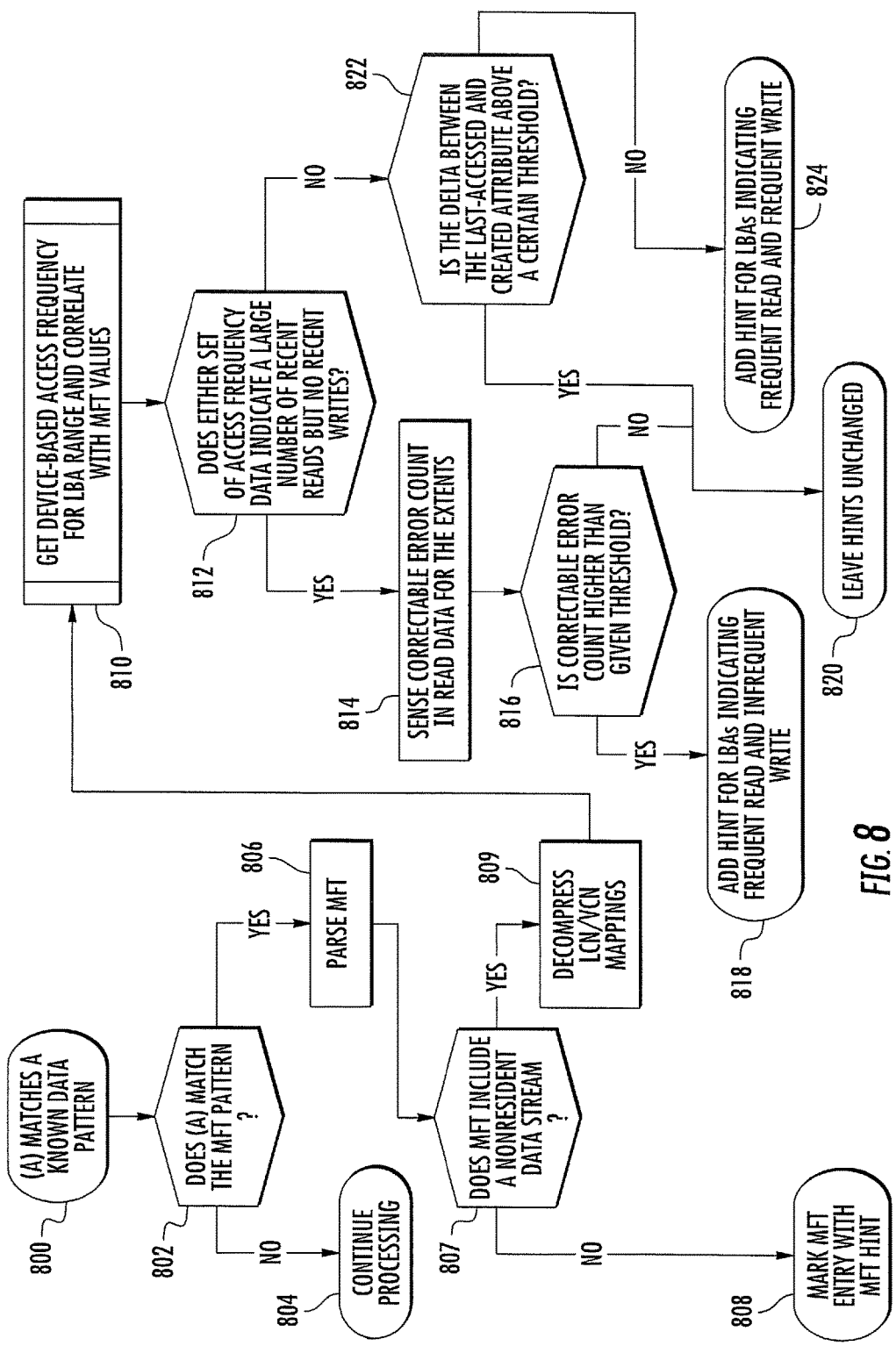
FIG. 8 is a flow chart illustrating an exemplary process for deriving hints from frequently read and frequently accessed attributes in a master file table according to an embodiment of the subject matter described herein.

A frequently read or frequently written hint can be based on combinations of these two inputs, as described below with respect to FIG. 8. Referring to FIG. 8, in step 800 and 802, it is determined whether the file and the data in an I/O request matches the MFT pattern. As described above, the MFT pattern in a Windows file system is the word "FILE". If the file name does not match the MFT pattern, control proceeds to step 804 where additional processing is performed to determine whether the data matches any of the other patterns described above.

If the data in the I/O request matches the MFT pattern, control proceeds to step 806 where the MFT is parsed. Parsing the MFT may include locating the MFT entry corresponding to the I/O operation. In step 807, it is determined whether the MFT entry includes a non-resident data stream. If the MFT entry includes a resident data stream, control proceeds to step 808 where the entry is marked with a hint indicating that the LBA range in the I/O request corresponds to an MFT resident file. If the MFT entry includes a non-resident data stream, control proceeds to step 809 where the LCN/VCN mappings are decompressed to determine the locations of the extents that store the non-resident file. Once the LCN/VCN mappings are determined, control proceeds to step 810 where the device based access frequency for the LBA range is obtained from the access frequency map and that access frequency is correlated with the MFT attributes that correspond to file access frequency. In step 812, it is determined whether either set of access frequency data indicates the large number of reads but no recent writes. If the access frequency data indicates a large number of reads but no recent writes, control proceeds to step 814 where a correctable error count is sensed in read data for the extents. In step 816, it is determined whether the correctable error count is higher than a given threshold. If the correctable error count is higher than a given threshold, control proceeds to step 818 where a hint is created for the LBAs indicating frequently read and infrequently written. If the correctable error count is not higher than a given threshold, control proceeds to step 820 where the hints associated with the LBA range are left unchanged.

Returning to step 812, if it is determined that either set of access frequency data does not indicate a large number of reads but no recent writes, control proceeds to step 822 where it is determined whether the difference between the last accessed and created attribute is above a threshold. If the last accessed and created attribute is above the threshold, this means that the file is static, and control proceeds to step 818 where the hints are left unchanged. If the difference between last accessed and created attribute is not above the threshold, this means that the file is frequently read and written, so control proceeds to step 824 where a hint is added to the logical block addresses indicating frequently read and frequently written data. As described above, hints that indicate frequently read and frequently written data can be used to place the data in a region of the storage device that contains memory cells with a larger comparative number of remaining program and erase cycles.

Although in the examples illustrated in FIGS. 7 and 8 file system metadata is parsed in the context of an I/O request, the subject matter described herein is not limited to deriving hints from file system metadata in the context of an I/O request. File system metadata constitutes data that is stored in nonvolatile memory. Accordingly, such metadata can be parsed independently of I/O operations to derive hints associated with LBA ranges corresponding to files referenced in file system metadata.

In addition, the subject matter described herein is not limited to parsing timestamps and filenames to derive hints. Another type of file system metadata that may be used for hint derivation are file attributes (read only, hidden, system, compressed) that can also be extracted to help with hinting. For example, if a file is marked read only, then it is not likely that the file will be modified and the file can be stored in a static portion of nonvolatile memory 208. Similarly, if a file is marked as hidden or system, this typically refers to the file is being a part of the operating system. A file that is part of the operating system is one that is not likely to be modified, so it could also be stored in a static portion of nonvolatile memory 208. The file attributes can be combined with any of the attributes or other sources described herein for enhanced hint derivation.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

A storage device includes a nonvolatile memory. The storage device further includes a hint derivation module for automatically deriving, from host accesses to the storage device, hints regarding expected future host accesses to a table that maps logical memory addresses to physical memory addresses in the nonvolatile memory. The storage device further includes an adaptive host memory buffer (HMB) caching module for using the hints to identify portions of the table to cache in the HMB and for caching the identified portions in the HMB, which is external to the storage device and accessible by the storage device via a bus.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

One of skill in the art will recognize that the subject matter described herein is not limited to the two dimensional and three dimensional exemplary structures described but cover all relevant memory structures within the spirit and scope of the subject matter as described herein and as understood by one of skill in the art.

It will be understood that various details of the subject matter described herein may be changed without departing from the scope of the subject matter described herein. Furthermore, the foregoing description is for the purpose of illustration only, and not for the purpose of limitation.

What is claimed is:
1. An apparatus comprising:
  a storage device comprising nonvolatile memory;
  a hint derivation module configured for deriving, from host accesses to the storage device, hints regarding expected future host accesses to the storage device; and
  an adaptive caching module within the storage device, the adaptive caching module operable for caching portions of a table comprising mappings between logical addresses and physical addresses of the nonvolatile memory, wherein, in response to a current host access, the adaptive caching module is configured to:
  use the hints to determine first and second expected future host accesses to the storage device;
  select a first portion of the table to cache in a memory internal to the storage device based on the first expected future host access, the first portion selected to include mappings for logical addresses associated with the first expected future host access; and
  select a second portion of the table to cache in a host memory external to the storage device based on the second expected future host access, the second portion selected to include mappings for logical addresses associated with the second expected future host access.

2. The apparatus of claim 1, wherein the nonvolatile memory comprises flash memory.

3. The apparatus of claim 1, wherein the nonvolatile memory comprises one or more of: NAND flash memory and NOR flash memory, and wherein the nonvolatile memory comprises one or more of: a two-dimensional configuration and a three-dimensional configuration.

4. The apparatus of claim 1, wherein the nonvolatile memory includes solid state memory and at least one disk storage device.

5. The apparatus of claim 1, wherein:
  the hint derivation module is configured to identify a file corresponding to the current host access; and
  the adaptive caching module is further configured to select the portion of the table to include mappings for logical addresses associated with the file.

6. The apparatus of claim 1, wherein:
  the table comprises a flash translation layer (FTL) table; and
  the adaptive caching module is further configured to maintain a primary FTL cache in static random access memory associated with the storage device and a secondary FTL cache in the host memory, wherein the first portion of the table is selected to cache in the primary FTL cache and the second portion of the table is selected to cache in the secondary FTL cache.

7. The apparatus of claim 6 wherein the second expected future host accesses are predicted to follow one or more of the first expected future host accesses.

8. The apparatus of claim 1, wherein:
  the hints associate the current host access with a sequential access pattern; and
  the adaptive caching module is further configured to:
    use the sequential access pattern to identify first logical addresses predicted to be accessed following the current host access and the second logical addresses predicted to be accessed following the first logical addresses;
    cache the first portion of the table within internal random access memory of the storage device, the first portion selected to include mappings for the first logical addresses; and
    cache the second portion of the table within the host memory, the second portion selected to include mappings for the second logical addresses.

9. The apparatus of claim 1, wherein the hint derivation module is configured to derive the hints in-line or asynchronously with the host accesses to the storage device.

10. A method comprising:
  deriving, from host access requests to a storage device, hints for predicting future host access requests to the storage device, the storage device comprising translation entries that map logical memory addresses to physical memory addresses of a nonvolatile memory; and
  using the hints to cache selected translation entries with an adaptive caching module within the storage device, wherein using the hints in response to a first host access request comprises:
    predicting a future host access request, the future host access request pertaining to one or more logical memory addresses;
    selecting translation entries corresponding to the one or more logical memory addresses;
    caching the selected translation entries in a memory within the storage device; and
    caching additional selected translation entries corresponding to additional predicted future host access requests in a host memory buffer external to the storage device.

11. The method of claim 10, wherein the nonvolatile memory comprises flash memory.

12. The method of claim 10, wherein the nonvolatile memory comprises one or more of: NAND flash memory and NOR flash memory, the nonvolatile memory having one or more of: a two-dimensional configuration and a three-dimensional configuration.

13. The method of claim 10, wherein the nonvolatile memory comprises solid state memory and at least one disk storage device.

14. The method of claim 10, wherein:
  deriving the hints further comprises identifying a file affected by the first host access request to the storage device; and
  the logical memory addresses associated with the predicted future host access request comprise logical memory addresses corresponding to the file.

15. The method of claim 10, wherein caching the selected translation entries and the additional selected translation entries further comprises:
  maintaining a primary flash translation layer (FTL) cache in static random access memory associated with the storage device for caching the selected translation entries; and
  maintaining a secondary FTL cache in the host memory buffer for caching the additional selected translation entries.

16. The method of claim 15, further comprising:
  storing translation entries that are expected to be accessed next by a read command in the primary FTL cache; and
  storing translation entries expected to be accessed later in the secondary FTL cache.

17. The method of claim 15, wherein:
  deriving the hints comprises determining that the first host access request comprises includes identifying one of the accesses to the nonvolatile memory as a request to read a video file; and
  using the hints in response to the first host access request further comprises:
    predicting first future host access requests corresponding to a next few frames of the video file and second future host access requests corresponding to a remainder of the video file;
    storing the selected translation entries pertaining to the first future host access requests in the primary FTL cache, and storing the additional selected translation entries pertaining to the second future host access requests in the secondary FTL cache.

18. The method of claim 10, wherein deriving the hints comprises one or more of deriving the hints in-line with accesses to the nonvolatile memory and deriving the hints asynchronously with the accesses to the nonvolatile memory.

19. A non-transitory computer readable medium having stored thereon instructions to configure a processor of a computing device to perform operations comprising:

deriving, from host accesses to a storage device comprising nonvolatile memory, hints regarding expected future host accesses to a table that maps logical memory addresses to physical memory addresses in the nonvolatile memory; and caching one or more portions of the table in response to a current host access to the storage device with an adaptive caching module within the storage device, the caching comprising:

using the hints to determine a first future host access to a first logical memory address, different from a logical memory address of the current host access, and determining a second future host access to a second logical memory address, identifying a first portion of the table that maps the first logical memory address to a physical memory address in the nonvolatile memory and identifying a second portion of the table that maps the second logical memory address to a second physical memory address; and caching the first portion of the table in a host memory buffer external to the storage device and caching the second portion of the table within internal memory of the storage device.

20. The non-transitory computer readable medium of claim 19, wherein the second future host access is predicted to precede the first future host access.

* * * * *